B. J. Greely.
Suspender.

№ 3492 Reissued Jun. 8, 1869.

Witnesses:
Theo Luscher
C. L. Topliff

Inventor
B J Greely
By Munn & Co
Atty

UNITED STATES PATENT OFFICE.

BENJAMIN J. GREELY, OF BOSTON, MASSACHUSETTS.

IMPROVEMENT IN SUSPENDERS.

Specification forming part of Letters Patent No. 50,351, dated October 10, 1865; Reissue No. 3,492, dated June 8, 1869.

*To all whom it may concern:*

Be it known that I, BENJAMIN J. GREELY, of Boston, in the county of Suffolk and State of Massachusetts, have invented a new and useful Improvement in Suspenders; and I do hereby declare that the following is a full, clear, and exact description thereof, which will enable others skilled in the art to make and use the same, reference being had to the accompanying drawings, forming part of this specification, in which—

Figure 1:
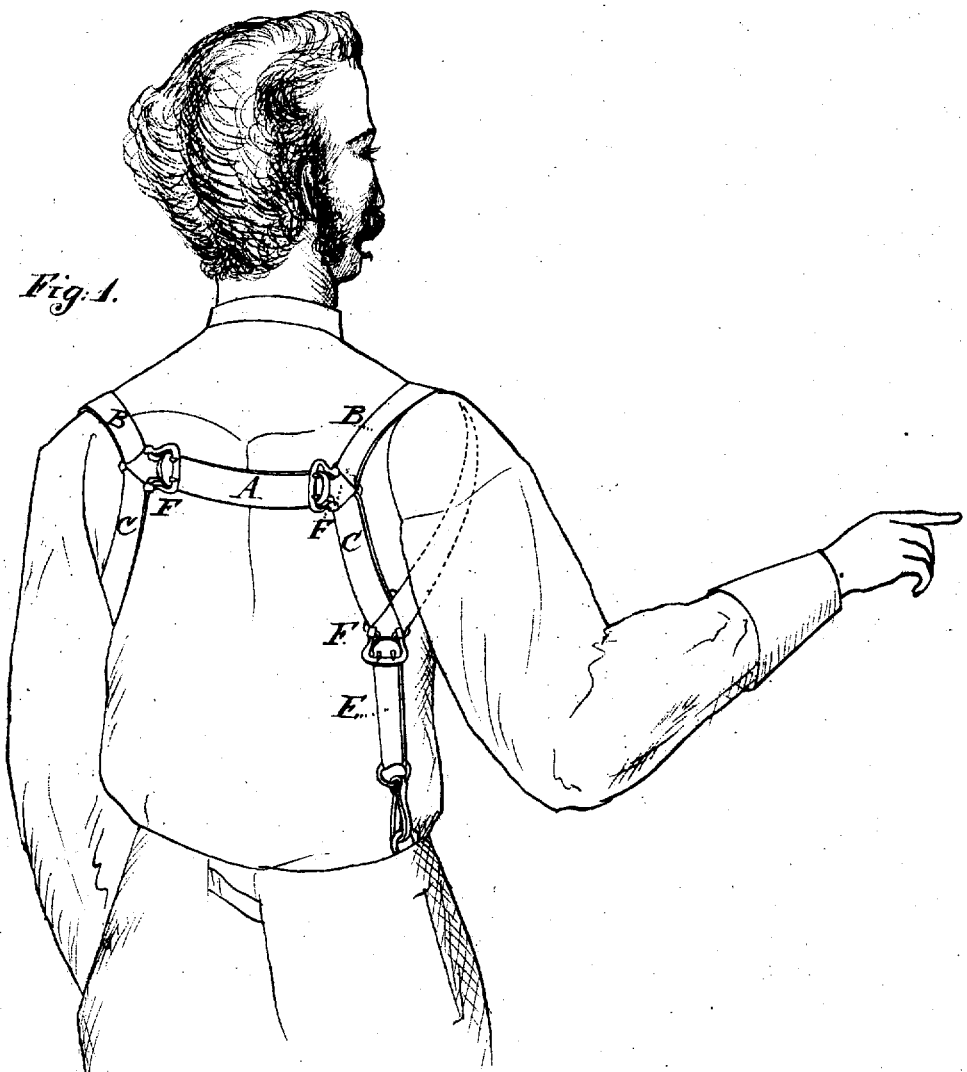
Figure 2:
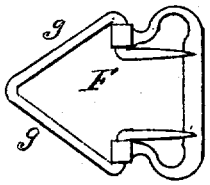

Figure 1 represents a pair of suspenders embodying my invention, and the same figure shows how they are applied and worn. Fig. 2 is a detailed view of one of the buckles.

The main object of my invention is to distribute the strain of the garment to be suspended upon the shoulders by bringing it nearly in a line from the top of the shoulder to the hip-bone on the same side, which is accomplished by suspending the garment from straps passing over the shoulders and uniting under the arms, connected together behind to prevent them from slipping, the points of suspension being at the sides of the wearer, by which the suspenders are made much more comfortable and less liable to bring an undue strain upon their fastening to the garment. When an adjustable connection is made behind, as shown in the drawings, it makes an efficient shoulder-brace and suspenders combined, which I regard as a second important object of my invention. Lastly, the spring-hook and ring I regard as much preferable to the common button-hole and button.

In the suspender shown in the drawings, which, it will be seen, embodies all my improvements in one article, the side straps, E, (only one of which is seen in the drawings,) are attached to the ring on the band of the garment by means of a hook. These straps extend upward along the sides of the wearer under the arms to the buckles F, by which they are respectively attached to the shoulder and back straps C and B. The straps B extend from the upper termination of the straps E upward along the chest and thence over the shoulders, respectively, to a point over the shoulder-blades, where they are met by a horizontal strap, A, and also by diagonal straps C. The latter proceed from the upper ends of the vertical straps E upward to about the height of the shoulder-blade, where they meet the ends of the straps B, which have passed over the shoulders and downward along the back, and also the ends of said strap A. The connection of the straps C B E under the arm is made by means of a buckle of peculiar construction, a detailed view whereof is given in Fig. 2. The back bar of the buckle is so formed as to make connection with both the straps C and B. although they occupy positions nearly at right angles to each other, and this is accomplished by giving the said bar two inclinations, *g g*, at right angles to each other, or nearly so. The strap C is fastened to one side of the bar and the strap B to the other, while the tongue of the buckle is fastened to the upper end of the strap E. This description applies to both sides of the person. The upper ends of straps C and those ends of straps B which surmount the shoulders are connected to each other through buckles F of the same form as represented in Fig. 2. The horizontal strap A is held by the tongues of such buckles, and it can be taken up or lengthened out at pleasure in order to brace the shoulders. The strap A serves thus not only to keep the suspenders formed of the several straps, C B E, in their proper places, but also serves to brace the shoulders when desired.

The suspenders and shoulder-brace above described embody all the parts of my invention in the best manner known to me; but it is obvious that this construction is not the only one that will answer.

It is also obvious that the brace-strap A may be made in two parts with one buckle, instead of being a single strap with two buckles.

The ordinary button-holes may of course be used instead of the hook.

I do not claim to be the first to support pantaloons at the side, but so far as I know or believe no suspender has ever been before made where the front and back portions of the main straps were connected together under the arms or at the sides of the wearer, so as to bring the strain of the garment to be supported in a line from the top of the shoulder-blade to the hip-bone on the same side.

What I do claim as my invention, and desire to secure by Letters Patent, is—

1. Suspenders consisting of straps passing over the shoulders, uniting under the arms, the two connected together behind, and provided with suitable devices for sustaining the pantaloons at the sides, the whole arranged so as to operate substantially as described.

2. In combination with the straps and devices for sustaining the pantaloons specified in the first claim, the adjustable strap A when so arranged as to form a combined shoulder-brace and suspender.

3. The combination, with suspenders and pantaloons, of a spring-hook and ring, substantially as and for the purpose specified.

B. J. GREELY.

Witnesses:
J. E. MAYNADIER,
CHAS. F. SLEEPER.